Oct. 12, 1937.　　　E. M. BRACKETT ET AL　　　2,095,309
GAUGE AND GAUGE STOP MECHANISM FOR TRIMMING AND CUTTING MACHINES
Filed Jan. 8, 1934　　　7 Sheets-Sheet 1
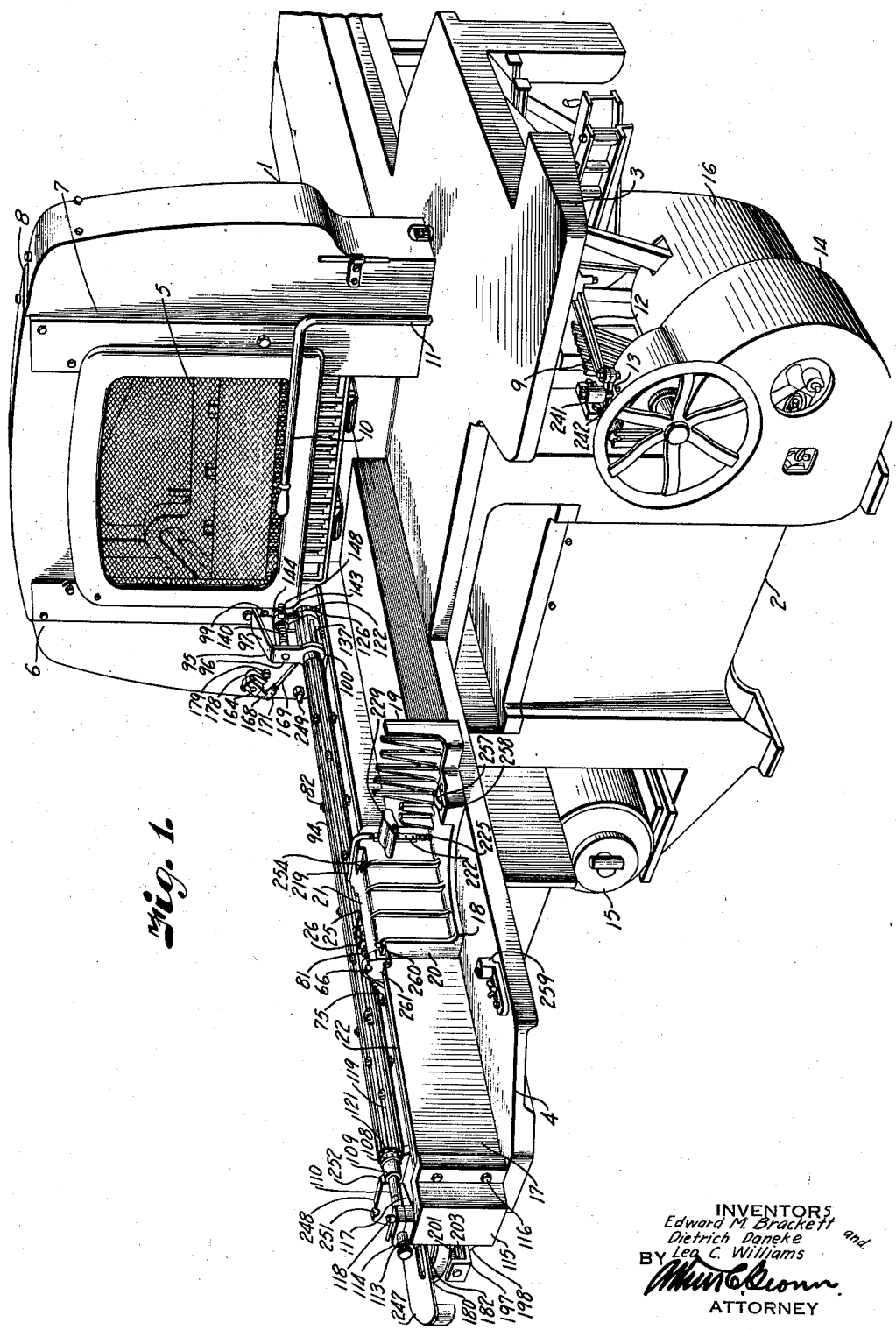
INVENTORS
Edward M. Brackett and
Dietrich Daneke
Leo C. Williams
BY
ATTORNEY

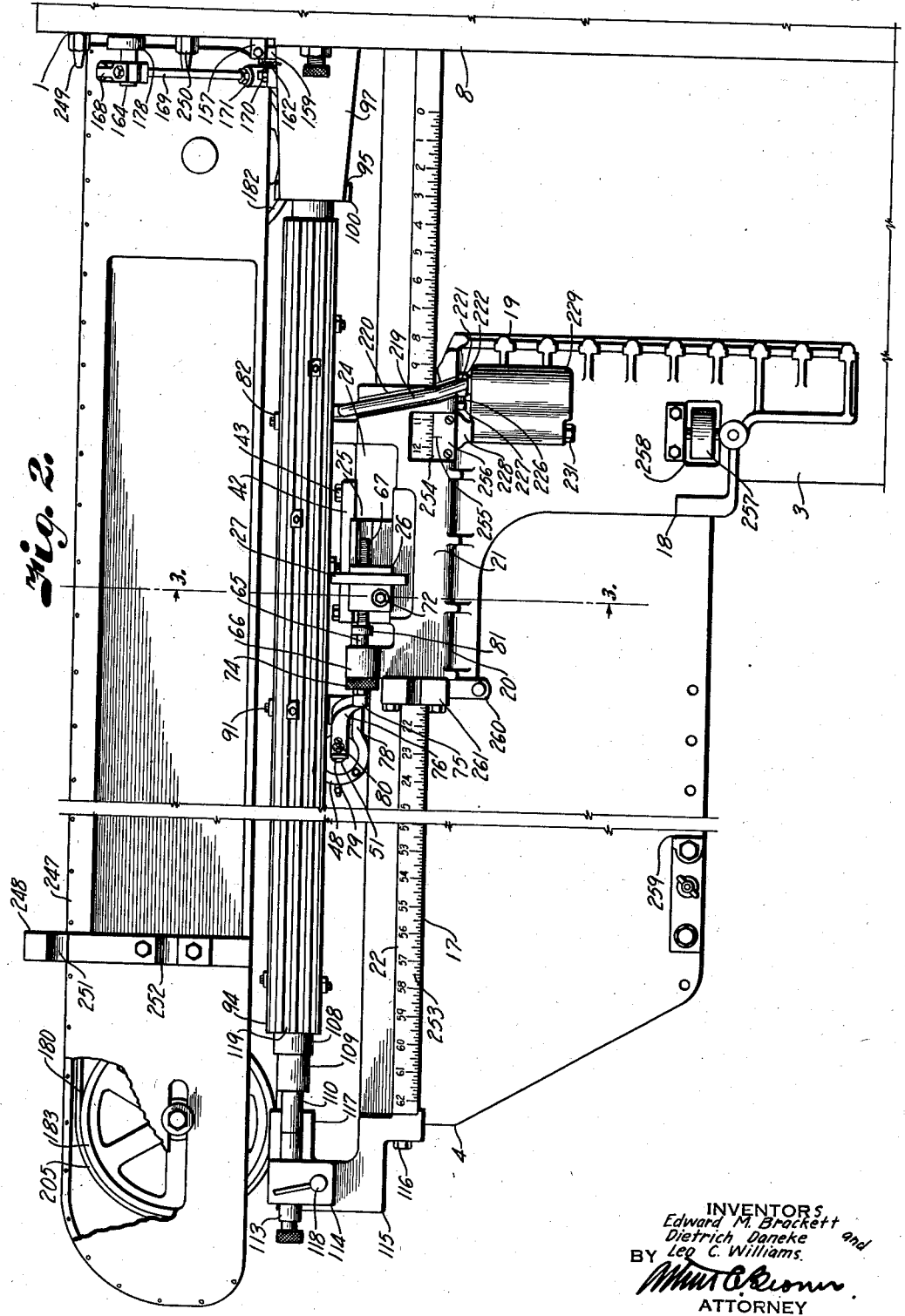

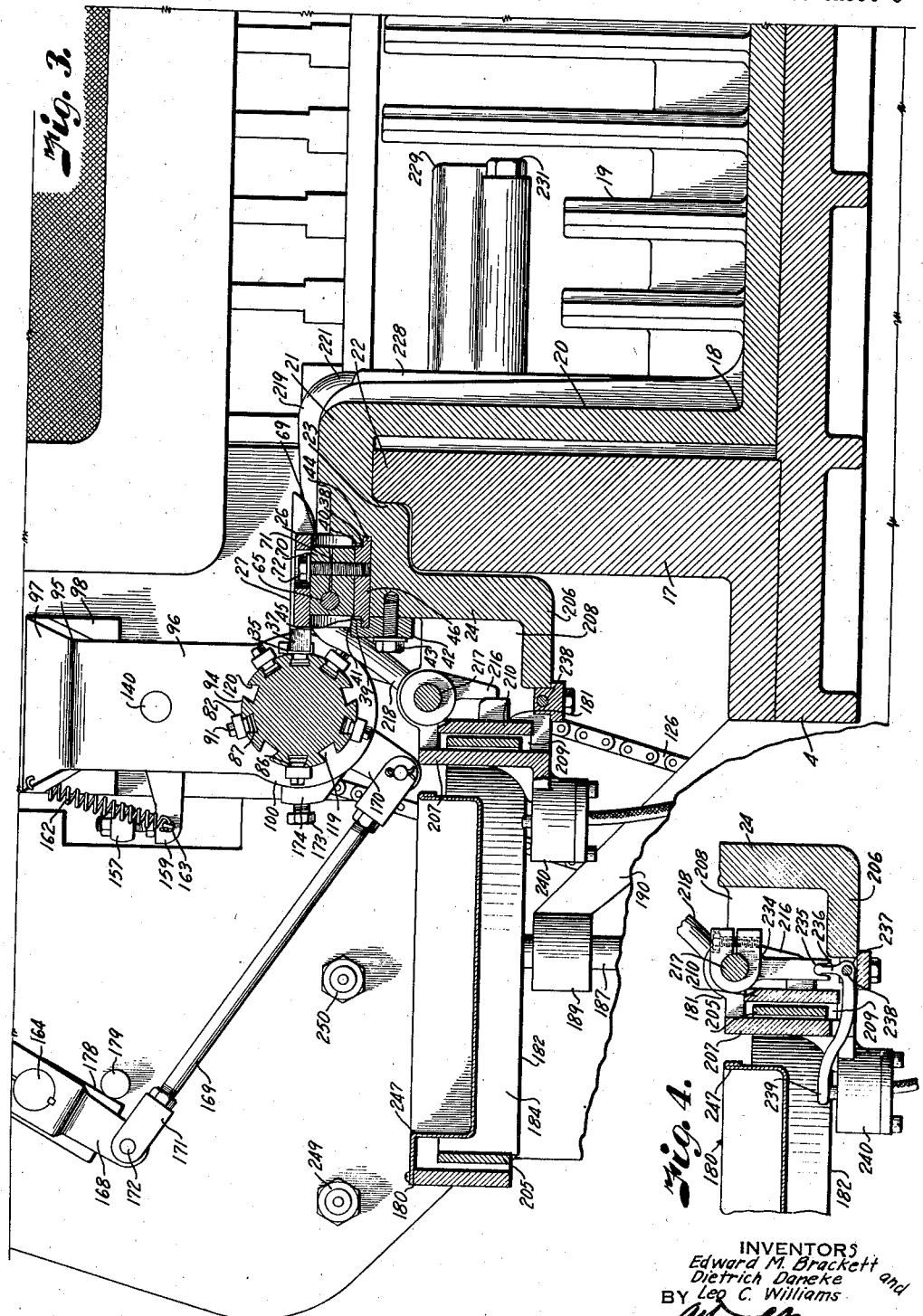

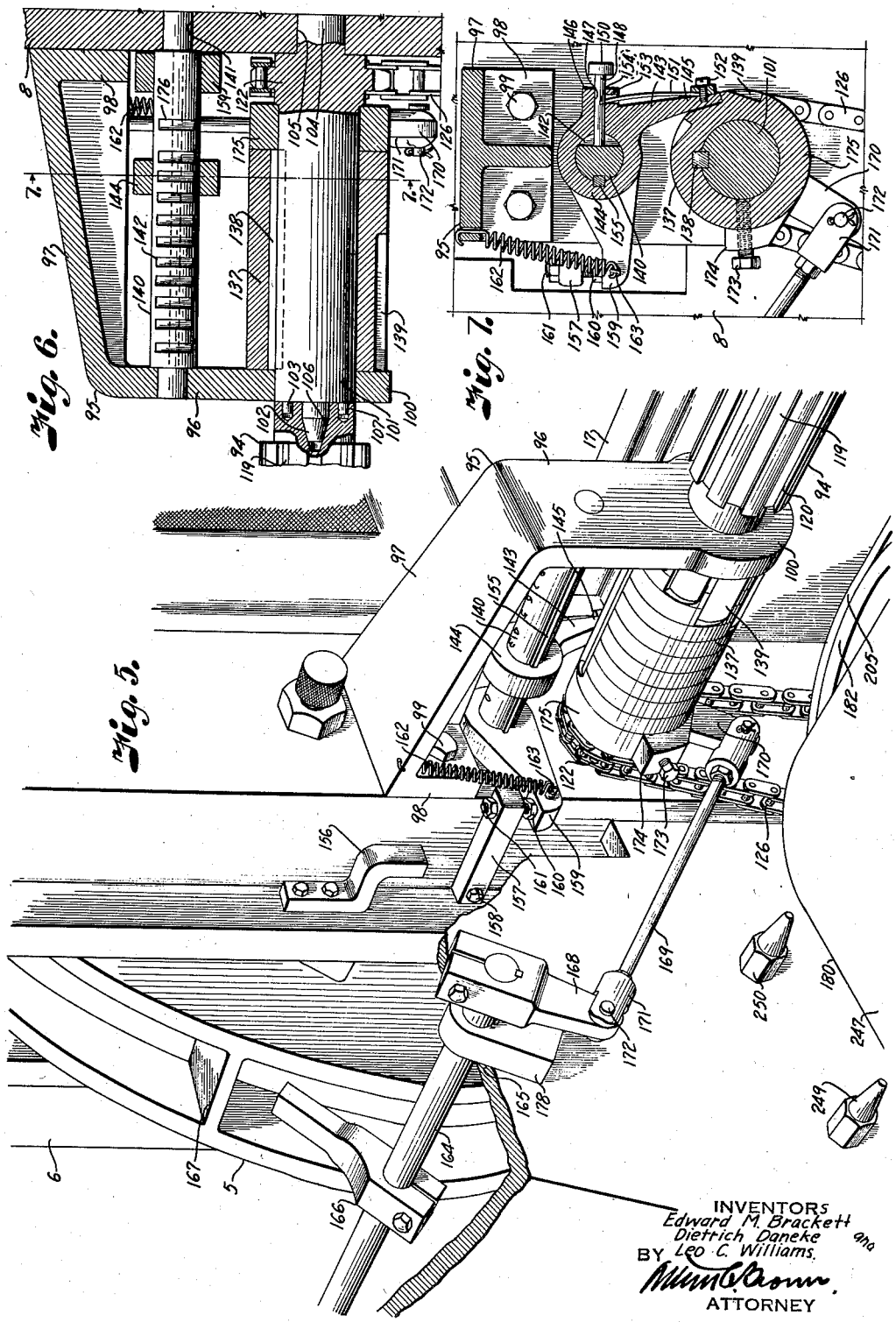

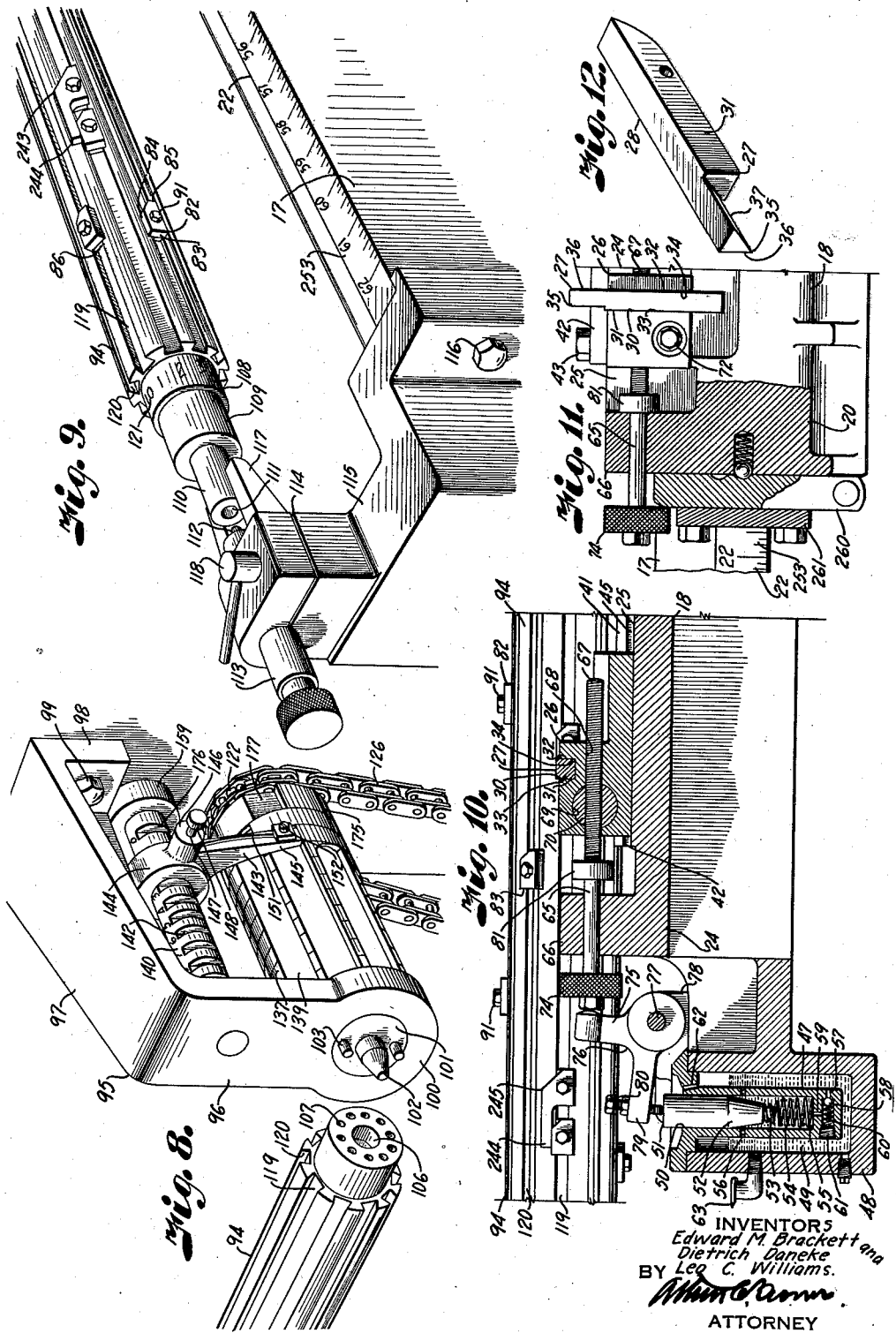

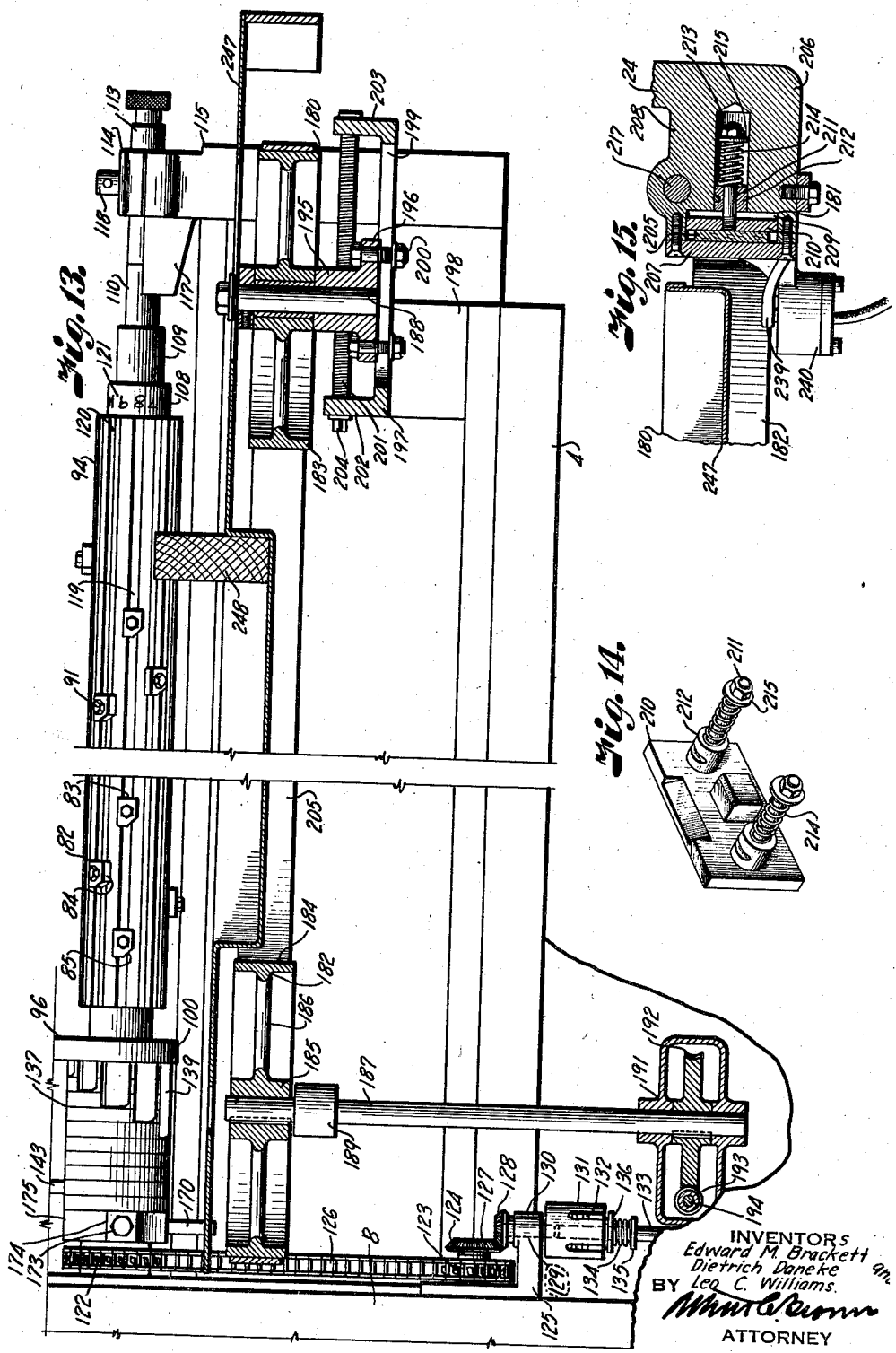

Oct. 12, 1937.   E. M. BRACKETT ET AL   2,095,309
GAUGE AND GAUGE STOP MECHANISM FOR TRIMMING AND CUTTING MACHINES
Filed Jan. 8, 1934   7 Sheets-Sheet 7
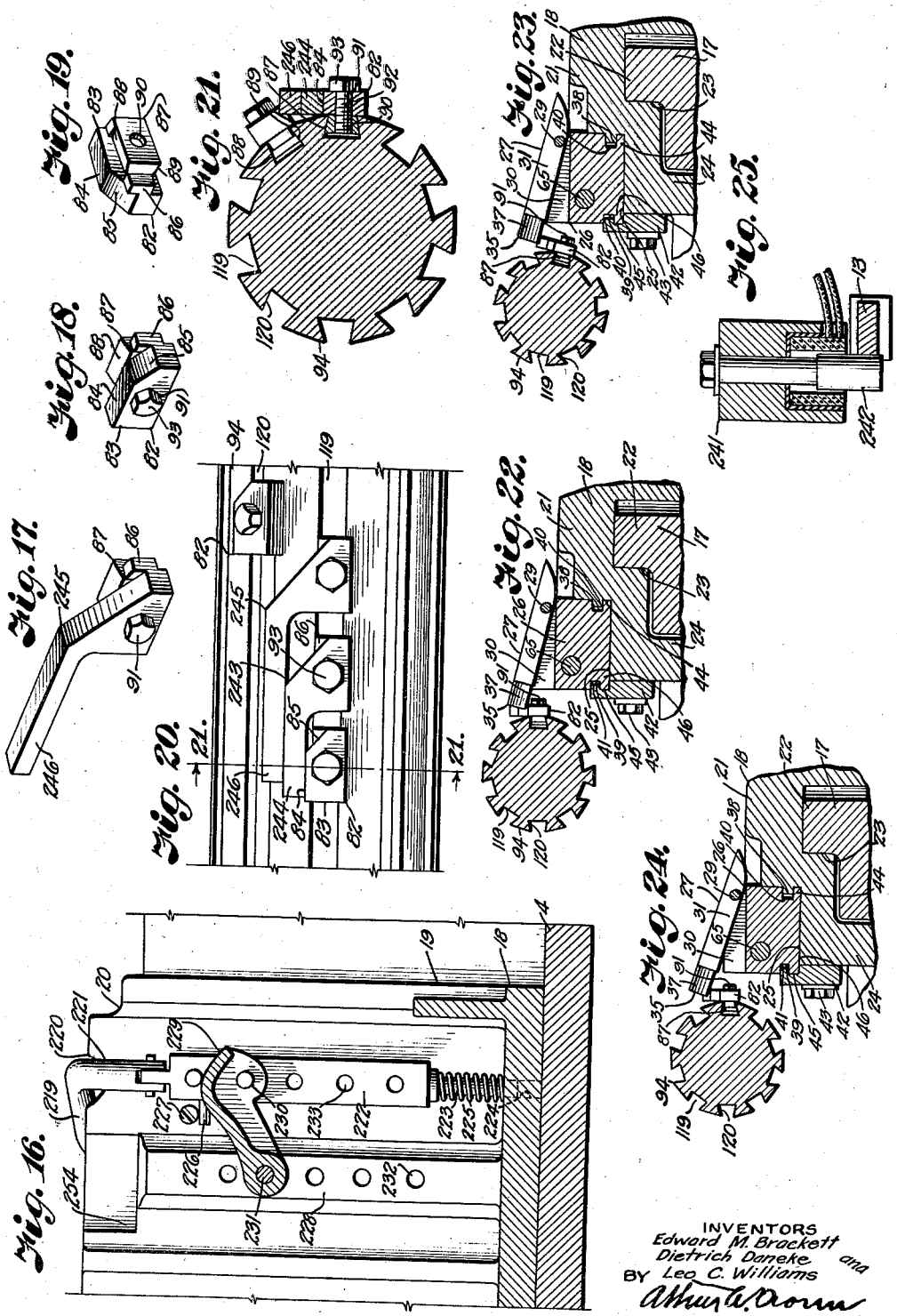
INVENTORS
Edward M. Brackett
Dietrich Daneke  and
BY Leo C. Williams
ATTORNEY Patented Oct. 12, 1937

2,095,309

UNITED STATES PATENT OFFICE 2,095,309

GAUGE AND GAUGE STOP MECHANISM FOR TRIMMING AND CUTTING MACHINES

Edward M. Brackett, Dietrich Daneke, and Leo C. Williams, Topeka, Kans., assignors, by mesne assignments, to Dexter Folder Company, New York, N. Y., a corporation of New York (1934)

Application January 8, 1934, Serial No. 705,760

29 Claims. (Cl. 164—59)

Our invention relates to cutting and trimming machines and more particularly to a gauge and gauge stop mechanism for automatically positioning the stock to be operated upon, the present invention being directed to improvements in a similar mechanism disclosed in United States Patent No. 1,743,421, issued on January 4th, 1930.

In the mechanism disclosed in the patent, it is necessary to provide a gauge stop cylinder for each stock-run through the machine, or else the stops must be readjusted between each run owing to the fact that a stop groove is required for each cut of the stock.

It is the principal object of the present invention to provide a plurality of job set-ups upon a single stop cylinder so that it is not necessary to transpose cylinders or readjust the stops when changing from one run to another.

Other objects of the invention are to provide for close setting of all the respective stops required for a run of stock in a single groove of the stop cylinder, to provide for more accurate positioning of the stock to be cut, to provide checking engagement of the stock carrier with the stops so that the stock is always retained in contact with the carriage, to provide for automatic movement of the carriage in carrying the stock to position for making the respective cuts, and to provide safety factors to protect the operator of the machine from injury.

It is also an important object of the present invention to provide a gauge stop mechanism which may be actuated in a manner similar to that described in the above mentioned patent.

In accomplishing these and other objects of the invention, we have provided improved details of structure, the preferred form of which is illustrated in the accompanying drawings, wherein:

Fig. 1 is a perspective view of a cutting and trimming machine equipped with a gauge and gauge stop mechanism embodying the features of our present invention.

Fig. 2 is an enlarged plan view of a portion of the table, stock carriage, and the gauge and gauge stop mechanism for positioning the carriage on the table when gauging the respective cuts.

Fig. 3 is an enlarged cross sectional view on the line 3—3, Fig. 2, particularly illustrating the stop cylinder and conveyor means for automatically moving the carriage to stop in gauging position.

Fig. 4 is a detail sectional view of the clutch for engaging the conveyor belt and the associated control mechanism for the safety switch which governs operation of the knife actuating mechanism.

Fig. 5 is an enlarged detail perspective view of the mechanism for actuating the stop cylinder.

Fig. 6 is a longitudinal sectional view of the ratchet mechanism for moving the stop cylinder.

Fig. 7 is a vertical section through the ratchet mechanism on the line 7—7, Fig. 6.

Fig. 8 is a perspective view of the ratchet mechanism and the stop cylinder particularly illustrating the driving connection therewith, the stop cylinder being shown in disengagement with the ratchet mechanism to better illustrate the driving connection.

Fig. 9 is an enlarged detail perspective view showing the method of mounting the opposite end of the gauge cylinder.

Fig. 10 is a vertical cross section through the mechanism for checking movement of the carriage when the stop arm thereon engages one of the stops on the gauge cylinder.

Fig. 11 is an enlarged plan view, partly in section, illustrating the latch mechanism for preventing operation of the check mechanism.

Fig. 12 is a detail perspective view of the carriage stop arm.

Fig. 13 is an enlarged longitudinal section through the conveyor mechanism for moving the stock carriage, particularly illustrating the drive therefor, as well as part of the driving mechanism for the stop cylinder.

Fig. 14 is a detail perspective view of the movable clutch shoe which engages the conveyor belt to effect movement of the carriage.

Fig. 15 is an enlarged detail section through a portion of the clutch carrier arm of the carriage, illustrating engagement of the clutch mechanism with the conveyor belt.

Fig. 16 is an enlarged vertical section through the control handle for actuating the conveyor clutch to effect movement of the carriage, and the safety switch for locking out movement of the knife operating mechanism.

Fig. 17 is a detail perspective view of one of the stop elements employed where it is necessary to obtain relatively short movements of the carriage, as when squaring the sides of a substantially square piece of stock, or making two cuts in close proximity to each other.

Fig. 18 is a detail perspective view of one of the gauge stops.

Fig. 19 is a similar view of one of the gauge stops, as seen from the opposite side.

Fig. 20 is a detail view of a portion of a gauge cylinder showing one of the stops and its associated stop elements as set up in making relatively close cuts, that is, cuts where the stops must be made between the length of the stop elements.

Fig. 21 is a cross sectional view on the line 21—21, Fig. 20.

Fig. 22 is a cross sectional view through the stop cylinder and the arm of the carriage mounting the stop arm.

Fig. 23 is a similar view showing the stop cylinder after it has moved into position whereby the stop arm engages the upper stop element.

Fig. 24 is a similar view of the stop arm in engagement with the upper stop element after the stop cylinder has returned to functional position.

Fig. 25 is a detail sectional view through the solenoid controlling the knife operating mechanism.

Referring more in detail to the drawings:

1 designates a cutting and trimming machine of the type employed in cutting various stock such as stacks of sheet material, circulars, catalogs, and other matter printed in gangs, where it is necessary to cut off and trim the edges of the respective printed matter.

The machine includes a base portion 2 carrying a horizontally positioned table 3 having a lateral and rearwardly extending portion 4 on which the stacks of sheet material are fed into cutting relation with a knife 5. The knife 5 is reciprocably mounted in suitable guides 6 and 7 provided in the adjacent faces of an inverted U-shaped supporting frame 8 that extends above the table 3. The knife 5 is reciprocated, as in customary manner, upon actuation of a control lever 9 having a handle 10 positioned above the path of travel of the stock to be cut by the knife. The lever 9 includes a vertical portion 11 extending through the table 3 and having an arm 12 connected therewith for actuating a clutch through a connecting link 13, the clutch being enclosed in a housing 14 forming a part of the base 2 and which connects the motor 15 with the transmission indicated by the housing 16 for effecting operation of the knife.

The mechanism just described is conventional to present cutting and trimming machines and specifically forms no part of the present invention, but is illustrated to give a better understanding of the gauge and gauge stop mechanism that is associated therewith.

In cutting off the respective printed matter, each stack of sheet material is placed upon the table 3 with one side thereof moving in guided relation with a longitudinal guide 17 that squares the stock with the knife so that the knife cuts at right angles to that side of the stock.

The first cut is perhaps a trimming cut across the end of the stock and the successive cuts are to separate the respective sets of printed matter to form individual catalogs, the sheets of a book, or for whatever purpose the stock is to be used. After running the stock through the trimmer to cut off the respective sets of printed matter, the side edges thereof may be trimmed to the proper size by turning the stock at right angles to the position that they assumed when making the first run and running the sections through the machine in a similar manner.

In order to accurately position the stock so that the cuts are made in the proper place, it is necessary to provide a gauge mechanism to gauge the position of the stock prior to making the cut, as set forth in the above mentioned patent.

This is accomplished by moving the stock with the side thereof in guided relation with the guide 17 by a carriage 18 that is slidably mounted on the top of the table 3 and has an abutment portion 19 engaging the rear end of the stock and a right angularly extending guide portion 20 moving in sliding contact with the face of the guide 17. The carriage is moved in the direction of the knife until the place where the first cut is to be made aligns with the cutting edge of the knife. The knife is then actuated to make the cut after which the carriage is advanced to the point of making the next cut and so on until all of the cuts have been made.

In order to quickly and accurately gauge the points at which the cuts are to be made, stops are provided for engaging the carriage when the point at which the cut is to be made aligns with the cutting edge of the knife, as now to be described.

The upper edge of the guide portion 20 of the carriage is provided with a laterally extending flange portion 21 that extends over a rail 22 of the guide 17 and has a guide shoulder portion 23 engaging the outer face of the rail and the upper face of the guide to cooperate with its inner face in retaining the carriage in sliding contact therewith. The guide shoulder portion 23 terminates in a laterally extending flange portion 24 to form a seat 25 for a block 26 carrying a stop arm 27.

The stop arm is best illustrated in Fig. 12 and comprises a substantially rectangular body portion 28 that is pivotally mounted on a pin 29 in a transverse groove 30 of the block 26. The groove 30 is of sufficient width to provide free sliding engagement of the opposite faces 31 and 32 of the stop arm with adjacent faces 33 and 34 of the groove for a purpose later described. The stop arm has a triangular shaped head portion 35 having a stop engaging forward face 36 lying in the plane of the forward side 32 of the arm and a downwardly inclined opposite face 37 to form a cam surface for effecting lifting of the stop arm when it engages a stop element upon retractive movement of the carriage.

The block 26 is slidably mounted on the seat portion 25 of the flange portion 21 and has side grooves 38 and 39 respectively engaging an inwardly extending rib 40 on the flange 21, and a rib 41 on a block 42 that is fixed to the flange 24 by fastening devices 43 extending through the block and threaded into the flange, as shown in Fig. 3. The rib 40 is spaced from the seat 25 to provide a groove 44 cooperating with a groove 45 in the block 42 for accommodating the T-shaped head flange 46 that is formed on the block by reason of the grooves 38 and 39.

It is thus apparent that the block is retained in sliding engagement with the carrier so that when the carrier is moved to advance the stack under the knife, and the projecting stop face of the arm 27 engages a stop element, the block 26 will be detained by the stop element while the carriage continues its advance until stopped by checking mechanism now to be described.

This is an important feature of the present invention for the reason that if the carriage is abruptly stopped when the stop arm engages the stop element, the inertia at the moment of impact will cause the stock to move from the abutting portion 19 of the carriage and the cut will not be made in the proper place, but by providing checking means for absorbing the first of the shocks, the carriage may be brought to a gradual stop so that the stock remains in contact with the carriage.

The checking mechanism is best illustrated in Fig. 10 and includes a cylinder 47 that is suspended within an outer cylinder 48. The inner cylinder 47 is spaced from the outer cylinder 48 to provide an annular reservoir 49 therebetween for retaining a checking fluid.

Slidable in the open upper end 50 of the inner cylinder is a piston 51 having a cone shaped lower end 52 terminating in an axial boss 53. The piston 51 is normally retained in its upper position by a coil spring 54 having one end engaging the bottom 55 of the inner cylinder and its upper end engaging around the boss 53.

Formed in the wall of the inner cylinder 47 in horizontal alignment with the cone shaped lower end of the piston are ports 56 through which the fluid in the inner cylinder is expelled on downward movement of the piston under influence of the movement of the block 26 when the stop arm 27 thereon engages one of the stop elements.

By observing Fig. 10, it will be noted that as the piston moves downwardly, the liquid space surrounding the lower end thereof is gradually constricted adjacent the outlet openings 56 so that flow therethrough is gradually throttled to retard downward movement of the piston.

When the piston moves in an upward direction under influence of the spring 54, the fluid is drawn from the annular reservoir 49 through a port 57 that is normally retained closed by a ball valve 58 and through a port 59 provided in the lower end of the inner cylinder.

The ball valve 58 is retained in seating position to close the port 57 by a coil spring 60 having one end engaging the ball and at its opposite end a plug 61 threaded into the wall of the inner cylinder 47.

The outer cylinder 48 is vented through a port 62 and is provided with a suitable fitting 63 by which the lubricant may be inserted into the reservoir 49.

In order to operably connect the piston 51 with the stop arm carrying block 26, we provide a rod 65 that is slidably mounted in an ear 66 formed on the upper face of the flange 21 and having a threaded forward end 67 extending loosely through an axial bore 68 in the block.

Formed in the block and extending transversely of the bore 68 is a larger bore 69 for mounting a cylindrical nut 70 that is threaded onto the end of the rod 65 to adjustably connect the rod with the block.

In order to clamp the cylindrical nut to the threaded end of the rod, the nut is preferably split, as at 71, and provided with a draw screw 72 whereby the split portion of the nut can be drawn together to bind the threaded end of the shaft and retain it in selected position.

The rear end of the rod is provided with a knurled head 74 by which the rod may be rotated in the nut to effect its adjustment, as later described, and which engages the arm 75 of a bell crank lever 76.

The bell crank lever 76 is pivotally mounted on a pin 77 that is rotatably mounted in ears 78 carried by the flange 24 so that the other arm 79 of the bell crank extends over the axis of the piston 51, as shown in Fig. 10. The arm 79 carries an adjusting screw 80 having a projecting end engaging the upper end of the piston to adjust the relation of the cone shaped end of the piston with the ports 56.

Fixed on the rod 65 between the block 26 and the ear 66 is a stop collar 81 adapted to be engaged by the ear 66 when the block is stopped upon engagement of the stop arm with one of the stop elements, so that the point at which the cut is to be made in the stock may be positively aligned with the cutting edge of the knife, the checking action of the piston 51 taking place during the time that the ear 66 is advancing into contact with the stop collar 81.

During this movement, it is apparent that the bell crank lever arm 75 engages the end of the rod to cause downward movement of the piston relatively to the ports 56 allowing the checking mechanism including the pivotal mounting of the bell crank to continue their forward movement since they are a part of the carriage. As the cone shaped lower end of the piston moves across the ports 56, a checking action will take place as the flow of fluid through the ports to the outer chamber 49 is gradually restricted owing to the taper thereof. Downward movement of the piston 51 will place the spring 54 under tension to store up energy for moving the piston to retracted position and advancing the block 26 relatively to the carriage when the stop element is moved out of engagement with the stop arm as later described.

The provision of this movement is an important feature of the present invention as it enables control of the stop arm when the stop means must be located in close relation in making successive cuts.

The stop members 82 are best illustrated in Figs. 17, 18, 19 and 20 and are shown as comprising substantially rectangular body portions having stop arm engaging faces 83 and flat upper faces 84 terminating in downwardly inclined cam portions 85 for engaging the inclined cam portion 37 of the stop arm when the carriage is moved into retractive position so that the stop arm will be pivoted on its pin 39 to pass over a stop member.

Extending from the inner face of the stop member at the opposite ends thereof are spaced guide ribs 86 for retaining an anchoring nut 87 therebetween. The anchoring nut 87 is dove-tail in cross section and arranged so that the upper and lower sides 88 and 89 thereof converge outwardly from the inner face of the stop lug. The nut 87 is provided with a threaded opening 90 for receiving a screw 91 that is threaded through an opening 92 in the stop member and which has a head 93 adapted to engage the outer face thereof for drawing the anchoring nut toward the inner face of the stop member when the screw is rotated to anchor the stop member in a groove of a stop cylinder now to be described.

In making the respective cuts, through the stock, it is apparent that a stop member must be provided for each cut to be made so that the carriage will be stopped in the proper place to make each individual cut and in order to mount the stop members, we provide a stop cylinder 94 which is best illustrated in Figs. 1, 2, 3, 8, 9 and 13.

The stop cylinder is substantially of the same construction as that described in the above mentioned patent and includes a cylindrical body extending longitudinally of the vertical guide 17 at the side thereof opposite to the carriage 18 and is mounted so that a plane extending through its horizontal axis is in substantial alignment with the stop arm when it is in stop engaging position, as shown in Fig. 3.

The mounting for the cylinder is best illustrated in Figs. 8 and 9 wherein its forward end is shown as carried by an L-shaped bracket 95 including a depending arm 96 spaced from the frame 8 by an integral arm 97 having an attaching flange 98 that secures the bracket by fastening devices 99 extending through the flange and into threaded openings in the frame. The lower end of the arm 96 carries a ring shaped bearing portion 100 rotatably mounting one end of a driving member 101.

The driving member has a cone shaped center 102 and diametrically spaced driving pins 103 on the end thereof that are mounted in the bearing 100. The opposite end of the driving member has a pintle portion 104 rotatably mounted in a socket 105 in the frame 8, Fig. 6. The center 102 engages in a cone shaped socket 106 in the end of the cylinder while the pins 103 engage in selected pairs of apertures 107 formed in circular series about the axis of the cylinder.

The forward end of the cylinder is, therefore, supported in axial alignment by the cone shaped center 102 and is connected in driving relation with the driving member 101 through the pins 103 engaging in the apertures 107.

The opposite end of the cylinder includes stepped collar portions 108 and 109 terminating in a trunnion extension 110 having a cone shaped axial socket 111 which engages a cone shaped center 112 that is formed on the end of a rod 113 which is slidably mounted in a split bearing 114, as clearly illustrated in Fig. 9.

The bearing 114 is formed on a Z-shaped casting 115 that is carried on the end of the guide 17 and is attached thereto by fastening devices 116. The bearing 114 carries a forwardly extending trough shaped bearing portion 117 for the trunnion 110 which is retained therein by the center 112.

When the center is in engagement with the socket, the split bearing 114 is clamped about the rod 113 by a screw 118 that extends loosely through the hub portion thereof but is threaded into a socket in the lower portion to draw the split sections of the bearing together in effecting clamping operation on the rod.

Formed in the periphery of the cylinder are a series of longitudinally extending dove-tailed grooves 119 having substantially the same width and depth as the dove-tail nuts 87 on the stop members so that when the nuts are slid into the dove-tailed grooves, the stop members may be retained in adjusted position therein by tightening cap screws 91 to draw the inclined sides of the nut into clamping engagement with the inclined faces 120 of the dove-tail grooves.

For the sake of convenience, each one of the grooves 119 may be numbered on the collar 108 as designated at 121 so that the stop members in each groove may be related to a particular run of stock through the trimming machine.

In the machine described in the above mentioned patent, where, for example, six cuts are to be made across a stock in one run through the machine, there will be one stop member located in each one of six adjacent grooves and the cylinder will be intermittently rotated to bring the successive stop members into position for stopping the carrier at the proper place, and the cylinder makes one complete revolution each time a gang of sheet material is fed through the machine.

Consequently, a cylinder is required for each run of stock through the machine. If not, the stop elements must be readjusted on the cylinder.

In the present invention, we provide for utilizing one groove for all of the stops so that if the cylinder contains ten grooves, each one of the grooves of the cylinder may be utilized for a different run through the machine without changing the cylinder or readjusting the stops, as now to be described.

When each individual groove is used for one run through the machine, we provide for oscillating the cylinder in a clockwise direction, Figs. 22 to 24, inclusive, just following each operation of the knife so that the stop elements may be moved out of engagement with the stop arm on the carriage to permit the carriage to be advanced to engage another stop element and so on until all of the cuts have been made.

When each individual groove is used for positioning the carrier, for each individual cutting operation of a run, we provide means for intermittently rotating the cylinder continuously in an anti-clockwise direction substantially similar to the operation described in the above patent.

In carrying out these respective movements of the cylinder, the driving member 101 is provided with a driving sprocket 122 that is driven from a sprocket 123 that is rotatably mounted on a stub shaft 124 carried in the bracket 125 which is fixed to the frame 8 at a point below the bracket 95 carrying the driving member 101, the driving connection being made through a chain 126 operating over the respective sprockets, Fig. 13.

The sprocket 123 is connected with a bevelled gear 127 also mounted on the stub shaft 124 and which meshes with a similar bevelled gear 128 that is fixed on a vertical shaft 129 rotatably mounted in a laterally projecting arm 130 of the bracket 125.

Fixed on the lower end of the shaft 129 is a cup shaped clutch member 131 frictionally engaging a series of driving elements 132 on a driving shaft 133, the driving shaft 133 being a continuously operating shaft driven from any of the moving parts on the trimmer or by an individual motor that is connected thereto in any desirable manner.

The driving elements 132 are interposed between similar driving disks that are connected with the clutch member 131 and the respective driving elements are retained in frictional driving contact with each other by a spring 134 having one end engaging against a collar 135 on the shaft 133 and against a collar 136 bearing on the lower driving element.

With the construction thus far described, it is apparent that the continuously rotating shaft 133 will drive the bevelled gears 128 and 127, sprocket 123, chain 126, and sprocket 122 to provide continuous rotation of the driving member 101 to continuously rotate the stop cylinder. Means is, therefore, provided to stop rotation of the cylinder when the respective stop elements are in position to be engaged by the stop arm on the carrier.

This is accomplished by a ratchet mechanism, Figs. 5, 6, 7 and 8, including a ratchet cylinder 137 keyed to the driving member 101 by a spline 138. The periphery of the ratchet sleeve is provided with a series of longitudinal ratchet grooves 139 extending from the end thereof adjacent the stop cylinder toward the end adjacent the sprocket 122 in progressively advancing distances to provide in effect a series of juxtaposed ratchet disks, each having a different number of ratchet teeth, the first, or that nearest the sprocket 122 having one ratchet tooth, the next two teeth, the next three teeth, and so on to that adjacent the stop cylinder which carries ten teeth, each tooth being complementary to one of the dove-tailed grooves in the stop cylinder.

The ratchet mechanism also includes a rotatable shaft 140 having one end mounted in the bracket arm 96 at a point above the actuator shaft 101 and its opposite end rotatably mounted in a socket 141 in the frame 8. The shaft is provided with a spaced series of transverse grooves 142 designated from zero to ten, the groove designated one being located directly over the portion of the ratchet cylinder having one tooth, the groove two over the portion of the cylinder having two teeth, the groove three over that portion of the cylinder having three teeth, and so on, so that the groove designated ten will be over that portion of the cylinder having ten teeth, as shown in Fig. 8.

Slidably mounted on the rotatable shaft 140 is a detent 143 including a collar 144 slidable on the shaft and having a depending pawl portion 145 adapted to engage in one of the ratchet grooves 139 when the pawl is positioned in alignment with one of the grooves designated from one to ten.

In order to retain the detent in alignment with one of the selective grooves, the collar 144 carries a radially extending boss 146 having an axial bore 147 in which is slidably mounted a pin 148 having an end 149 adapted to engage in one of the grooves and a head 150 on its opposite end by which the pin may be grasped to withdraw the end 149 so that the detent may be slid along the shaft to any one of the grooves, as later described.

The pin 148 is normally retained in engagement with the shaft 140 by a wire spring 151 having its lower end fixed to the lower end of the pawl by a clamping screw 152 and its upper end extending into an opening 153 formed in the boss and into a notch 154 in the shank of the pin, the opening 153 being of sufficient width to permit movement of the pin to withdraw the end 149 from the grooves. The detent 143 is fixed against rotation on the shaft by a spline 155 extending longitudinally thereof on the side opposite to the latch grooves.

With the construction thus far described, and assuming that the detent is in position over that portion of the ratchet sleeve having one tooth, the ratchet sleeve will make one complete revolution before it is again stopped by the pawl.

When the detent is latched in number two position, it will allow the ratchet sleeve to make one-tenth of a revolution and then nine-tenths of a revolution on consecutive operations of the knife; when in number three position, the sleeve can make two consecutive one-tenth revolutions and then eight-tenths of a revolution upon consecutive movements of the knife, and so on to the number ten position, where the sleeve makes one-tenth of a revolution at each consecutive operation of the knife.

It is thus apparent that if the detent is in the number one groove, the number one groove of the cylinder will make one complete revolution and be returned to the position at which it starts. If the detent is in number two groove on the shaft 140, the number one groove of the cylinder will be advanced one space for each of two operations and then eight spaces on the next operation of the knife to bring the number one groove to its original position, and so on.

If the detent is in the number ten groove, the cylinder will be advanced one groove upon each release of the detent to bring the next succeeding groove to position.

In the first instance, only one stop element will be used, in the second instance, two stop elements, in the third, three, and so on, each stop element gauging a cut to be made on an individual stack of sheet material.

For example, if only two cuts are to be made in the sheet material, at each run through the machine, a stop member will be positioned in grooves numbers one and two of the stop cylinder to stop the carrier at the proper position.

If six cuts are to be made, grooves numbers one, two, three, four, five and six will be used and the detent 143 will be positioned in the sixth groove so that it engages six of the ratchet teeth.

While we describe a uniform arrangement of the stop elements relatively to the grooves in the stop cylinder, it is obvious that any combination of arrangements for the stop elements may be used.

In order to lift the detent to permit rotation of the stop cylinder between successive cuts, the knife is provided with a projecting arm 156 that is arranged to engage a lever 157 near the lower end of the knife structure, the lever 157 being pivotally mounted on a stud 158 fixed to the frame 8.

The free end of the lever projects outwardly and engages a lever arm 159 that is fixed to the shaft 140 at a point substantially over the sprocket 122. The outer end of the lever engages against the head 160 of an adjusting stop screw 161 that is adjustably mounted in the end of the lever 157, the end of the lever being retained against the head of the screw by a coil spring 162 having one end fixed to a pin 163 on the lever arm 159 and its opposite end hooked to bracket 95.

It is thus apparent that at the end of each down stroke of the knife, the arm 156 will strike the lever 157 to cause the lever arm 159 to rock the shaft 140 in a counter-clockwise direction, Fig. 5, to lift the pawl from engagement with one of the ratchet grooves.

As soon as the pawl is released from the groove, the chain 126 is free to drive the ratchet sleeve 137 until it is again stopped by the pawl which has been returned into engagement with the sleeve by the spring 162 just as soon as the arm 156 disengages with the lever 157 on the up stroke of the knife. When the pawl engages the following ratchet groove, the actuator shaft will be locked against rotation thereby. However, this will not affect operation of the shaft 133 due to the slip clutch connection with the shaft 129.

With the ratchet mechanism thus described, the machine can be operated in substantially the same manner as that disclosed in the patent.

We prefer, however, to provide for using a single groove for each run through the machine and this is accomplished as previously pointed out by effecting oscillation of the actuator shaft 101.

To effect oscillation of the shaft in a clockwise direction so that the stop element is moved downwardly one space sufficient to permit passing of the stop arm, we provide a rock shaft 164 that is rotatably mounted in the frame 8 in bearings 165, Fig. 5.

Adjustably fixed on the shaft is a lever arm 166 projecting in the direction of the knife and having its free end in the path of travel of a web or lug 167 on the end of the knife, so that when the knife approaches the downward limit of the stroke, the web 167 will rock the end of the lever 166 to rock the shaft 164.

Fixed to the outer end of the shaft 164 is a lever arm 168 that is connected by a link 169 with a lever arm 170 loosely mounted on the actuator shaft 101 at a point between the ratchet sleeve and the sprocket 122, as shown in Figs. 5 and 6, the link 169 being pivotally connected with the ends of the levers 168 and 170 by yoke shaped heads 171 having wrist pins 172 extending through openings in the ends of the lever arms. The heads 171 preferably are threadedly mounted on the link 169 so that the spacing between the lever arms may be varied to adjust the relative positions of the arm 166 with the stop 167 on the knife.

When the stop cylinder is to be oscillated by the arm 166, the arm 170 is fixed in driving relation with the actuator shaft 101 by a set screw 173 threaded into a boss 174 on a collar 175 of the lever arm 170 and having its end engaging against the periphery of the actuator shaft 101.

The detent 143 previously described is then positioned in the groove designated 176 in the shaft 140 which is designated "0" so that the end of the pawl engages in a notch 177 in the collar 175. In this position the chain 126 is prevented from rotating the stop cylinder. However, when the lug 167 on the knife engages the arm 166, the arm 170 effects rotation of the stop cylinder in a clockwise direction to carry the stop elements out of engagement with the stop arm on the carrier, but upon the return movement of the knife, the driving action of the chain 126 through the slip clutch connection will rotate the actuator shaft 101 in an anti-clockwise direction to return the stop elements into alignment with the stop arm on the carrier.

When the stop elements are in position, the notch 177 will have engaged the detent to stop rotation of the actuator shaft 101 after which the clutch connection 131 will slip. When the set screw 173 is released, the movement of the rock shaft 164 in a counter-clockwise direction is limited by a stop lever 178 which engages a pin 179 on the frame 8, Fig. 3.

While the carriage may be slid manually across the table to engage the respective stops in the manner disclosed in the patent, we provide means for mechanically moving the carriage in order to reduce the effort on the part of the operator in moving heavy stacks of sheet material under the knife.

This is accomplished by an endless conveyor 180 that is positioned in parallel relation with the guide 17 and which is adapted to be selectively engaged with the carriage by a suitable clutch mechanism 181. The conveyor includes horizontally spaced pulleys 182 and 183, each having a face flange 184 that is connected to a hub 185 by spokes 186.

The hub 185 of the pulley 182 is splined to a vertically positioned shaft 187 mounted at the forward end of the table and the pulley 183 is loosely mounted on a shaft 188 at the rear end of the table.

The shaft 187 has its upper end rotatably mounted in a bearing 189 supported by an arm 190 projecting from the side edge of the table 3 and its lower end is rotatably mounted in a gear housing 191 supported on the side of the base 2. Fixed on the shaft within the gear housing is a worm gear 192 meshing with a worm 193 on a constantly driven shaft 194. The shaft 194 may be operably connected with the shaft 133 or any continuously moving part of the trimming machine, or it may be driven by a separate individual drive, not shown.

The shaft 188 is rotatably mounted in a bearing 195 having a foot flange 196 that is adjustably mounted on a plate 197 supported from the table extension by an arm 198 similar to the arm 190 previously described.

The plate 197 has a longitudinal slot 199 for passing fastening devices 200 extending through the flange 196 to adjustably secure the bearing 195. The bearing 195 is adjustably movable on the plate 199 by a screw 201 having its ends rotatably mounted in vertical lugs 202 and 203 carried at the ends of the plate and which extends through a threaded opening in the bearing 195. The screw 201 is provided with a polygonal head 204 by which it may be rotated to adjust the spacing of the pulley 183 relatively to the pulley 182.

Operating over the face flanges 184 of the pulleys is an endless belt 205 having the inner run thereof moving in close proximity to the guide 17 at a point slightly below the rail 22, as best illustrated in Fig. 3.

The clutch mechanism 181 is supported on a lateral angular extension 206 carried by the flange 24 and includes a fixed plate 207 that is braced from the flange 24 by spaced webs 208 having slots 209 for passing the belt. The webs 208 also carry a movable clutch plate 210 at the outer side of the belt to clamp the belt against the plate 207. The clutch plate 210 is supported by pins 211 slidable in bushings 212 fixed in recesses 213 in the webs 208 and is normally retained from engagement with the belt by springs 214 having their ends bearing against the bushings 212 and against collars 215 on the pins, Figs. 14 and 15.

The movable clutch plate is actuated by a cam 216 on a rock shaft 217 which is rotatably mounted in the webs 208 and has an upwardly extending arm 218 terminating in a horizontal portion 219 extending across the top of the flange 21 in a transverse groove 220. The end of the horizontal portion 219 at the inner face of the guide portion 20 of the carriage is curved downwardly, as at 221, to connect with a sliding bar 222 movable vertically of the portion 20 of the carriage at the rear of the back stop portion 19.

The bar 222 has a guide pin 223 on its lower end that is slidably mounted in an opening 224 in the carriage and is normally retained in its uppermost position by a coil spring 225 having one end bearing against the bar and its opposite end against the carriage. The upward movement of the bar is limited by a pin 226 thereon which engages a stud 227 threaded into the side portion 20 of the carriage, Fig. 16.

Pivotally mounted on a vertical post 228 on the side portion 20 of the carriage is a hand support 229 that is pivotally connected with the bar 222 by a pin 230, the hand support being pivotally mounted on the post by a pin 231. The hand support is adjustably mounted relatively to the height of the stack by providing a series of apertures 232 in the post 228 for receiving the pin 231 and the bar 222 is provided with a similar series of apertures 233 for receiving the pin 230 whereby the hand support can be positioned relatively to the height of the stacks run through the machine.

To effect engagement of the clutch, the hand is placed on the hand support in such a manner that the weight thereof causes depression of the bar 222 against tension of the spring 225. This movement of the bar rocks the shaft 217 to cause the arm 216 to move the clutch plate 210 into clamping engagement with the outer face of the belt and the inner face of the belt into clamping engagement with the fixed plate 207.

The belt will then cause movement of the carriage in the direction of the knife until the stop arm engages one of the stop elements on the stop cylinder. When this occurs, stopping of the carriage will cause the belt to slip between the clamping plates 207 and 210 so that the carriage remains in position to make the cut.

To control operation of the knife, we provide a safety mechanism so that before the operator can pull the lever 9 with his right hand, the left hand of the operator must be resting on the lever 229.

Connected with the shaft 217, Fig. 4, is a lever 234 having a yoke shaped lower end 235 that engages the arm 236 of a bell crank lever 237. The bell crank lever 237 is pivoted on a lug 238 that is fixed to the portion 206 of the flange 24.

The other arm 239 of the bell crank lever projects under the plate 207 and actuates a switch 240 that is connected in circuit with a solenoid 241, Fig. 25, which controls a detent 242 for latching the link 13 previously described.

When the hand of the operator is resting on the lever 229, the circuit will be closed through the switch 240 to effect retraction of the detent 242 and allow movement of the link 13 when the control lever 9 is operated.

In some instances, as previously described, it is necessary to locate the stops relatively close together. When this occurs, it is impossible to use the stop elements disclosed in Figs. 18 and 19.

We therefore provide a special stop element 243 having projecting fingers 244 adapted to extend over the upper edge 84 of the first stop member. If other stop elements are required, another specially constructed stop element 245 is provided having a longer finger 246 which is positioned over the finger 244, as clearly shown in Fig. 20. On the first cut the stop arm 27 engages the stop element 82, on the next cut the end of the finger 244, and on the next, the end of the finger 246.

The conveyor belt for moving the carriage may be enclosed by a suitable guard 247, Fig. 2, having a supporting bar 248 extending across its forward end to cooperate with cone shaped centers 249 and 250 projecting from the face of the frame 8 to support extra stop cylinders which are used in the machine, the forward ends of the extra cylinders being supported by the centers 249 and 250 and the ends 110 resting in seats 251 and 252 in the bar 248.

In order to set the stops for obtaining correct spacing of the respective cuts to be made in the stock, the top face of the rail 22 is provided with a scale 253 that is readable through an opening 254 in the carriage, the carriage being set relatively to the scale by means of a gauge mark 255 on a plate 256 mounted in the opening 254, as shown in Fig. 2.

To relieve the weight of the carriage on the table, the outer end thereof may be supported upon a roller 257 that is mounted in a slot 258, Fig. 1, and has its periphery operating on the table extension. A stop 259 may also be provided on the table for limiting the retractive movement of the carriage.

To operate the carriage by hand without aid of the conveyor, it may be desirable to lock out the checking mechanism. This may be accomplished when desired by a sliding latch bar 260 mounted in guide 261 and arranged to engage between the knurled collar 74 and the lug 66, Fig. 1.

In operating a cutting and trimming machine equipped with a gauge and gauge stop mechanism constructed as described, a series of stop elements for making the respective cuts are positioned at the correct place in one of the grooves 119 to stop the carriage when the knife aligns with the place at which the cuts are to be made.

A stack of sheet material to be operated upon is then placed with the longitudinal side thereof in contact with the guide plate 17 and the rear end bearing against the abutting portion 19 of the carriage.

The left hand of the operator is then placed upon the hand lever 229 to cause engagement of the clutch with the conveyor, which effects movement of the carriage over the table to project the stack of sheet material under the knife.

As soon as the stop arm 27 engages the first stop element, the stop arm carrying block will be detained thereby, but the carriage will continue until the collar 81 engages the front face of the lug 66. During this movement of the carriage, its momentum will be checked by the checking mechanism to absorb the shock of the stop arm engaging the stop element. The stack of sheet material will, therefore, remain in contact with the carriage.

Owing to the fact that there may be a margin on the end of the stack of sheets, adjustment may be required to allow for the extra length. This may be accomplished by adjusting the shaft 65 to vary position of the stop arm carrying block 26 on its guide track 25. This adjustment is made by loosening the clamping screw 72 and rotating the shaft 65 until the point at which the cut is to be made aligns with the cutting edge of the knife.

When all of the stops are placed in the same groove, the stop cylinder will be oscillated by the arm 166 which oscillation is made effective by tightening the set screw 173 to secure the collar 175 to the driving shaft 101. The detent 143 is moved to the "0" position so that the pawl thereof engages in the notch 177.

As soon as the carriage engages the first stop, the belt will slip between the gripping plates and remain in that position.

Operation of the hand rest 229 effects closing circuit through the switch 240 to the solenoid 241 to free operation of the knife actuating lever 9. This lever is then operated with the other hand to cause descent of the knife to make the first cut. As the knife nears the bottom of its stroke, the lug 167 will engage the lever arm 166 to rock the shaft 164, lever arm 168, to move the lever arm 170 in a clockwise direction through the connecting link 169, the levers being adjusted so that the stop cylinder may be rotated one space in a downward direction which removes the stop lug from engagement with the stop arm.

The stored up tension of the spring 54 in the check mechanism will cause slight movement of the stop arm carrying block 26 in a forward direction so that the stop arm will move over the top of the lower stop element.

Immediately upon the upward movement of the knife following the cut, the chain 126 which always has a tendency to rotate the sprocket 122 through the constantly driving shaft 133 will cause rotation of the driving shaft 101 in an anti-clockwise direction until the pawl of the detent reengages in the notch 177. This will return the cylinder so that the groove carrying the stop elements will align with the stop arm 27.

If the operator has kept his hand on the lever 229, the gripping action of the clutch plates 207 and 210 with the belt 205 will effect advancement of the carriage until the stop arm thereon engages the next stop element when the stack of sheet material will be in position to make the second cut.

The procedure is then the same as just described in making the first cut.

When the machine is to be operated by rotating the stop cylinder, the set screw 173 is loosened to allow free movement of the collar 175 on the drive shaft 101 so that when the lug 167 on the knife engages the lever arm 166, it will be ineffective in moving the stop cylinder.

The stop lugs are then positioned in four consecutive grooves of the stop cylinder and the detent 143 will be placed in number four position so that the stop cylinder will be advanced in a counter-clockwise direction after each operation of the press in substantially the manner as in the structure disclosed in the above mentioned patent.

In some jobs it may happen that stop elements must be mounted in a groove in such a position that it is impossible to locate them in the proper spaced relation. When this occurs, the first stop element is inserted in the groove and the other stop elements of the form shown in Fig. 17 are positioned in the grooves so that the projecting ends thereof overlie the first stop element, as clearly shown in Fig. 20.

When the carriage is moved to make the first cut, the stop arm 27 will engage the stop element 82.

To make the second cut, the stop cylinder will be oscillated one space in a clockwise direction, as above described, and the stop arm will allow movement of the carriage until it engages the finger 244.

In this engagement of the stop arm, the stop arm is in the position as shown in Fig. 22 and when the stop cylinder is again oscillated the stop arm will retain that position owing to the fact that the spring 54 in the check mechanism is constantly urging the carrier block for the stop arm 27 in a forward direction and the friction of the side 31 thereof engaging the side 33 of a slot 30 is greater than that between the end of the finger 244 and the stop engaging portion 36 of the stop arm 27. Consequently, when the cylinder moves in a downward direction, the end of the stop finger 244 will move away from the stop arm 27.

The stored up tension in the checking device will then immediately move the carrying block 26 in a forward direction to carry the stop arm into engagement with the next stop finger 246. The same phenomenon occurs when the stop cylinder is rotated to allow the stop arm to pass over the upper stop finger to the next stop element 82.

From the foregoing, it is apparent that we have provided an improved gauge and gauge stop mechanism wherein the stock may be accurately aligned to make the cuts in the proper places and that we have provided a gauge mechanism wherein a single cylinder may be employed for a plurality of different runs of the stock through the machine, thereby eliminating the necessity of changing the cylinder or rearranging the stop lugs therein to make the different runs.

It is also apparent that we have provided a machine that will provide safety factors to protect the operator against injury since both hands are distant from the knife when operating the machine.

What we claim and desire to secure by Letters Patent is:

1. In a machine of the character described having a movable knife and knife operating mechanism, a feed table, a carriage mounted on the feed table for moving stock into cutting relation with the knife, power operated carriage actuating means, and means on the carriage for connecting it with said carriage actuating means and including means for controlling said knife operating mechanism.

2. In a machine of the character described having a movable knife and knife operating mechanism, a feed table, a carriage mounted on the feed table for moving stock into cutting relation with the knife, control means for the knife operating mechanism, a carriage actuating means, movable locking means for the control means, and means for connecting the carriage with said carriage actuating means and including means for controlling movement of said locking means.

3. In a machine of the character described having a movable knife and knife operating mechanism, a feed table, a carriage mounted on the feed table for moving stock into cutting relation with the knife, a carriage actuating means, a clutch mechanism on the carriage for engaging the carriage actuating means, and means on the carriage for actuating the clutch to connect the carriage with the carriage actuating mechanism.

4. In a machine of the character described having a movable knife and knife operating mechanism, a feed table, a carriage mounted on the feed table for moving stock into cutting relation with the knife, a carriage actuating means, a slip clutch mechanism on the carriage for engaging the carriage actuating means, and means on the carriage for actuating the clutch to connect the carriage with the carriage actuating mechanism.

5. In a machine of the character described having a movable knife and knife operating mechanism, a feed table, a movable carriage mounted on the feed table for moving stock into cutting relation with the knife, an endless belt, means supporting the belt with a run thereof extending in parallel relation to movement of the carriage, a slip clutch mechanism supported on the carriage to engage said run of the belt and effect movement of the carriage, and means on the carriage for actuating the clutch mechanism.

6. In a machine of the character described having a movable knife and knife operating mechanism, a feed table, a carriage movably mounted on the feed table for moving stock into cutting relation with the knife, an endless belt, means for supporting the belt with a run thereof extending in parallel relation to movement of the carriage, a slip clutch supported on the carriage to engage said run of the belt and effect movement of the carriage, and means on the carriage for actuating the clutch and including means for controlling said knife operating mechanism.

7. In a machine of the character described having a movable knife and knife operating mechanism, a feed table, a carriage movably mounted on the feed table for moving stock into cutting relation with the knife, an endless belt, means for supporting the belt with a run thereof extending in parallel relation to movment of the carriage, a clutch mechanism supported on the carriage for engaging said run of the belt to effect movement of the carriage, control means for the knife operating mechanism, movable locking means for said control means, and means on the carriage for actuating the clutch and including means for controlling movement of said locking means.

8. In a machine of the character described having a movable knife and knife operating mechanism, a feed table, a carriage mounted on the feed table for moving stock into cutting relation with the knife, power operated carriage actuating means, means for connecting the carriage with said carriage actuating means to move said carriage at intervals and likewise feed said stock, a series of gauge stop elements, stop engaging means on the carriage, means normally supporting all of the gauge stop elements in the path of the stop engaging means, and means for moving said stop element supporting means in opposite directions to successively bring the stop elements into stopping relation with said stop engaging means.

9. In a machine of the character described having a movable knife and knife operating mechanism, a feed table, a carriage mounted on the feed table for moving stock into cutting relation with the knife, continuously operated carriage actuating means, means for connecting the carriage with said carriage actuating means and providing for continuous operation of the latter when the carriage is stopped, a series of gauge stop elements, stop engaging means on the carriage, means normally supporting all of the gauge stop elements in the path of the stop engaging means, and means for moving said stop element supporting means in opposite directions to bring the stop elements successively into stopping relation with said stop engaging means.

10. In a machine of the character described having a movable knife and knife operating mechanism, a feed table, a carriage movably mounted on the feed table for moving stock into cutting relation with the knife, a carriage actuating means, means for connecting the carriage with said carriage actuating means, a series of gauge stop elements arranged in alignment longitudinally of the machine, means supporting the gauge stop elements in juxtaposition with the carriage, stop engaging means on the carriage, and means for oscillating said stop element supporting means to successively bring the stop elements into stopping relation with said stop engaging means.

11. In a machine of the character described having a movable knife and knife operating mechanism, a feed table, a carriage mounted on the feed table for moving stock into cutting relation with the knife, a carriage actuating means, means for selectively connecting the carriage with said carriage actuating means, a series of gauge stop elements, stop engaging means on the carriage, means supporting the gauge stop elements for movement into and out of the path of movement of said stop engaging means, and means for selectively rotating or oscillating said stop element supporting means to selectively bring the stop elements into stopping relation with said stop engaging means.

12. In a machine of the character described having a movable knife and knife operating mechanism, a feed table, a carriage movably mounted on the feed table for moving stock into cutting relation with the knife, a series of carriage stop elements supported in engaging relation with the carriage to stop movement of the carriage, means on the carriage for controlling said knife operating mechanism, and means connected with the knife operating mechanism to release said stop elements from engaging position relative to the carriage.

13. In a machine of the character described having a movable knife and knife operating mechanism, a feed table, a carriage movably mounted on the feed table for moving stock into cutting relation with the knife, a series of gauge stop elements, stop engaging means on the carriage, adjustable means supporting the gauge stop elements in position to engage said stop engaging means, means for oscillating said stop element supporting means to successively bring the stops into stopping relation with said stop engaging means, and means on the stop element supporting means for holding one or more additional series of gauge stop elements thereon selectively brought into said position upon adjustment of said stop element supporting means and thereupon rendered effective upon oscillation thereof to successively bring the stops of the selected series into stopping relation with the stop engaging means.

14. In a machine of the character described having a movable knife and knife operating mechanism, a feed table, a carriage mounted on the feed table for moving stock into cutting relation with the knife, a plurality of series of stop elements, stop engaging means on the carriage, adjustable means supporting the series of stop elements and whereby any preselected series thereof may be moved into position to engage said stop engaging means, means actuated by the knife for oscillating the stop element supporting means in one direction to move said preselected series of stop elements from engagement with the stop engaging means, and means for oscillating the stop element supporting means in the opposite direction to return the preselected series of stop elements into position to be engaged by said stop engaging means.

15. In a machine of the character described having a movable knife and knife operating mechanism, a feed table, a carriage mounted on the feed table for moving stock into cutting relation with the knife, a carriage actuating means, means for connecting the carriage with said carriage actuating means, a series of stop elements, stop engaging means on the carriage, means supporting the stop elements in position to engage said stop engaging means, means actuated by the knife for oscillating the stop element supporting means in one direction to move said stop elements from engagement with the stop engaging means, and means for oscillating the stop element supporting means in the opposite direction to return the stop elements into position to be engaged by said stop engaging means.

16. In a machine of the character described having a movable knife and knife operating mechanism, a feed table, a carriage mounted on the feed table for moving stock into cutting relation with the knife, a carriage actuating means, means for connecting the carriage with said carriage actuating means, a series of stop elements, stop engaging means on the carriage, means supporting the stop elements, means for moving said stop element supporting means to successively bring the stops into stopping relation with said stop engaging means, and means connected with the carriage for checking the inertia thereof when the stop means engages one of the stop elements.

17. In a machine of the character described having a movable knife and knife operating mechanism, a feed table, a carriage movably mounted on the feed table for moving stock into cutting relation with the knife, a series of stop elements, stop engaging means on the carriage, means supporting the stop elements in position to be engaged by said stop engaging means, means for moving said stop element supporting means to successively bring the stops into stopping relation with said stop engaging means, and means connected with the carriage for checking the inertia thereof when the stop engaging means engages one of the stop elements.

18. In a machine of the character described having a movable knife and knife operating mechanism, a feed table, a carriage mounted on the feed table for moving stock into cutting relation with the knife, a carriage actuating means, means for connecting the carriage with said carriage actuating means, stop engaging means on the carriage, a series of stop elements, means supporting the stop elements to engage said stop engaging means, means for moving said stop element supporting means to successively bring the stops into stopping relation with said stop engaging means, and means connected with the carriage for checking the inertia thereof when the stop means engages one of the stop elements.

19. In a machine of the character described having a movable knife and knife operating mechanism, a feed table, a carriage mounted on the feed table for moving stock into cutting relation with the knife, a carriage actuating means, means for connecting the carriage with said carriage actuating means, stop engaging means on the carriage, a series of stop elements, means supporting the stop elements in juxtaposition with the carriage, means for oscillating said stop elements supporting means to successively bring the stops into stopping relation with said stop engaging means, and means connected with the carriage for checking the inertia thereof when the stop engaging means engages one of the stop elements.

20. In a machine of the character described having a movable knife and knife operating mechanism, a feed table, a carriage mounted on the feed table for moving stock into cutting relation with the knife, a carriage actuating means, means for connecting the carriage with said carriage actuating means, stop engaging means on the carriage, a series of stop elements, means supporting the stop elements in juxtaposition with the carriage, means actuated by the knife for oscillating the stop elements supporting means in one direction to move said stop elements from engagement with the stop engaging means, means for oscillating the stop element supporting means in the opposite direction to return the stop elements into position to be engaged by the stop engaging means, and means connected with the carriage for checking inertia thereof when the stop engaging means engages one of the stop elements.

21. In a machine of the character described having a movable knife and knife operating mechanism, a feed table, a carriage movably mounted on the feed table for moving stock into cutting relation with the knife, stop engaging means on the carriage, a series of stop elements, a cylinder supporting the stop elements in juxtaposition with the carriage, means actuated by the knife for oscillating the cylinder in one direction to move said stop elements from engagement with the stop engaging means, and means for oscillating the cylinder in the opposite direction to return the stop elements into position to be engaged by the stop engaging means.

22. In a machine of the character described having a movable knife and knife operating mechanism, a feed table, a carriage mounted on the feed table for moving stock into cutting relation with the knife, a series of stop elements, a cylinder having grooves for selectively mounting the stop elements, means for rotatably supporting the cylinder, a pivoted stop arm on the carriage, and means for oscillating said cylinder to successively bring the stops into stopping relation with said stop lever.

23. In a machine of the character described having a movable knife and knife operating mechanism, a feed table, a carriage mounted on the feed table for moving stock into cutting relation with the knife, a series of stop elements, a cylinder having grooves to mount the stop elements, means supporting the cylinder in juxtaposition with the carriage, a stop lever pivotally mounted on the carriage, means actuated by the knife for oscillating the cylinder in one direction to move said stop elements from engagement with the stop lever, means for oscillating said cylinder in the opposite direction to return the stop elements into position to be engaged by the stop lever, and means connected with the carriage for checking inertia thereof when the stop lever engages one of the stop elements.

24. In a machine of the character described having a frame, a knife movable on the frame and knife operating mechanism, a feed table, a carriage movably mounted on the feed table for moving stock into cutting relation with the knife, a series of stop elements, a cylinder having grooves to mount the stop elements, means supporting the cylinder with its axis in parallel relation to direction of movement of the carriage, a stop lever pivotally mounted on the carriage for engaging said stop elements, a rock shaft rotatably mounted on the frame, a lever on the rock shaft, means movable with the knife and engaging the lever for actuating the rock shaft, a driving member connected with the cylinder, a ratchet member on the driving member, means connecting the rock shaft with the ratchet member to effect movement of the cylinder in one direction and move said stop elements into position for engagement with the stop lever, and means for moving said cylinder in the opposite direction to return the stop elements into position to be engaged by the stop lever.

25. In a machine of the character described having a frame, a knife movable on the frame and knife operating mechanism, a feed table, a carriage movably mounted on the feed table for moving stock into cutting relation with the knife, a series of stop elements, a cylinder having grooves to mount the stop elements, means supporting the cylinder with its axis in parallel relation to direction of movement of the carriage, a stop lever pivotally mounted on the carriage for engaging said stop elements, a rock shaft rotatably mounted on the frame, a lever on the rock shaft, means movable with the knife and engaging the lever for actuating the rock shaft, a driving member connected with the cylinder, a ratchet member on the driving member, means connecting the rock shaft with the ratchet member to effect movement of the cylinder in one direction and move said stop elements into position for engagement with the stop lever, a second actuating means connected with the driving member, an actuator supported by the frame, and slip clutch means connecting the actuator with said actuating means for moving said cylinder in the opposite direction to return the stop elements into position to be engaged by the stop lever.

26. In a machine of the character described having a frame, a knife movable on the frame and knife operating mechanism, a feed table, a carriage movably mounted on the feed table for moving stock into cutting relation with the knife, a series of stop elements, a cylinder having grooves to mount the stop elements, means supporting the cylinder with its axis in parallel relation to direction of movement of the carriage, a stop lever pivotally mounted on the carriage for engaging said stop elements, a rock shaft rotatably mounted on the frame, a lever on the rock shaft, means movable with the knife and engaging the lever for actuating the rock shaft, a driving member connected with the cylinder, a ratchet member on the driving member, means connecting the rock shaft with the ratchet member to effect movement of the cylinder in one direction and move said stop elements into position for engagement with the stop lever, a ratchet sleeve on the driving member, a common detent for the ratchet sleeve and ratchet member, means for selectively positioning the detent to selectively control rotation of the ratchet sleeve, and actuating means for moving the driving member in reverse direction to return the stop elements into position to be engaged by the stop lever.

27. In a machine of the character described having a frame, a knife movable on the frame and knife operating mechanism, a feed table, a carriage movably mounted on the feed table for moving stock into cutting relation with the knife, a series of stop elements, a cylinder having grooves to mount the stop elements, means supporting the cylinder with its axis in parallel relation to direction of movement of the carriage, a stop lever pivotally mounted on the carriage for engaging said stop elements, a rock shaft rotatably mounted on the frame, a lever on the rock shaft, means movable with the knife and engaging the lever for actuating the rock shaft, a driving member connected with the cylinder, a ratchet member on the driving member, means connecting the rock shaft with the ratchet member to effect movement of the cylinder in one direction and move said stop elements into position for engagement with the stop lever, a ratchet sleeve on the driving member, a common detent for the ratchet sleeve and ratchet member, means for selectively positioning the detent to selectively control rotation of the ratchet sleeve, actuating means for moving the driving member in reverse direction to return the stop elements into position to be engaged by the stop lever, and means actuated by the knife for releasing said detent.

28. In combination with a stop cylinder having a longitudinal groove, a stop element, means for anchoring the stop element in selective position in the groove, a second stop element mounted in the groove, and a finger on said second stop element overlying the first stop element.

29. In a machine of the character described including a table, a carriage slidably mounted on the table, a stop cylinder rotatably supported above the table, stop elements on the cylinder, a stop arm for engaging the stop elements, a block slidably mounting the stop arm on the carriage, a rod connected with the block, a check mechanism, a bell crank lever having an arm engaging the rod and an arm engaging the check mechanism for checking inertia of the carriage when the stop arm engages one of the stop elements, and a stop collar on the rod for limiting movement of the carriage relatively to said block.

EDWARD M. BRACKETT.
DIETRICH DANEKE.
LEO C. WILLIAMS.